United States Patent [19]

Uchida et al.

[11] Patent Number: 4,839,317
[45] Date of Patent: Jun. 13, 1989

[54] LIGHTWEIGHT HEAT-INSULATING TUNDISH COATING MATERIAL

[75] Inventors: Yoshihiko Uchida; Kotaro Kuroda; Akihiko Kusano; Shinichi Fukunaga, all of Fukuoka, Japan

[73] Assignees: Kurosaki Refractories Co., Ltd., Fukuoka; Nippon Steel Corporation, Tokyo, both of Japan

[21] Appl. No.: 105,133

[22] Filed: Oct. 6, 1987

[30] Foreign Application Priority Data

Oct. 8, 1986 [JP] Japan .................. 61-238091

[51] Int. Cl.$^4$ ............................................. C04B 35/04
[52] U.S. Cl. ..................................... 501/108; 106/121
[58] Field of Search ......................... 501/108; 106/121

[56] References Cited

FOREIGN PATENT DOCUMENTS

| 0189258 | 7/1986 | European Pat. Off. ............ 106/121 |
| 204878 | 11/1983 | Japan . |
| 58-223672 | 12/1983 | Japan .................................... 501/108 |
| 57969 | 4/1984 | Japan . |

*Primary Examiner*—William R. Dixon, Jr.
*Assistant Examiner*—Anthony J. Green
*Attorney, Agent, or Firm*—Wenderoth, Lind & Ponack

[57] ABSTRACT

An interior coating material for continuous caster tundishes which consists of a mixture of 5 to 60% by weight of a lightweight magnesia aggregate having a bulk density of 2.0 or less, and 40 to 95% by weight of an aggregate which is one or more substances selected from the group consisting of electrically molten magnesia clinker, seawater magnesia clinker, burnt clinker prepared from natural magnesite, dolomite clinker and spinel clinker, plus binder, hardening agent and fibers.

1 Claim, 2 Drawing Sheets

Bulk density of lightweight magnesia

LIGHTWEIGHT HEAT-INSULATING TUNDISH COATING MATERIAL

BACKGROUND OF THE INVENTION

1. Field of the Invention

This invention relates to a coating material gunned onto the inner surface of the base refractories of continuous caster tundishes, and more particularly to a lightweight heat insulating coating material for dry gunning featuring lightness in weight, good heat insulating properties, and excellent abilities to prevent thermal erosion by slag, permeation of slag and liquid steel, and sticking to the base refractories.

2. Description of the Prior Art

For coating the inner surface of the base refractories of continuous caster tundishes, basic refractories have been used, with consideration given to the needs to prevent thermal erosion by slag, facilitate skull removal and assure production of clean steels.

As the amount of continuous casting increases in steelmaking, increasingly severe requirements have come to be set for the upgrading of steel quality and prolonging the life of tundish refractories. Requirements for the coating material (the refractories gunned onto the inner surface of the base refractories of tundishes are hereinafter called the "coating material") also have grown more exacting.

To satisfy such trade demands, efforts are continuing to achieve greater weight reduction and provide better heat insulating properties. Weight reduction and enhancement of heat insulating properties will make it possible to prolong the life of the coating material and base refractories by preventing the coating material from sticking to the base refractories and decreasing the thermal load imposed on the inner base refractories of tundishes. The same measures also result in saving energy consumption, which, in turn, permits cutting down the overall costs of tundishes.

The two main conventional measured adopted for the weight reduction of the coating material are as follows: A first method was to decrease the bulk density of the material by producing a foam matrix while the material is being kneaded with water. This type of material is used mainly in troweling and wet gunning. Another method achieves bulk density reduction by dispersing organic or inorganic fibers in the matrix. This latter type of material is applied mainly by dry gunning. The aforementioned two methods reduce the bulk density of the whole coating material by creating crevices in the matrix by means of foaming and fibers. The original matrix has already been made weaker than the base refractories by the use of the binder and other additives. Then, such measures make the matrix still weaker, thereby making the matrix more susceptible to slag erosion and the permeation of slag and liquid steel. To offset such disadvantages, such remedial measures as reduction in foam size by means of a foam sizing agent and the use of shorter fibers have come to be adopted. Notwithstanding such corrective measures, however, it has remained substantially unchanged that the aforementioned two types of methods depend on the crevices formed in the matrix for the reduction of bulk density and the enhancement of heat insulating properties. And such crevices, though reduced in size, make it impossible to completely prevent the permeation of slag and liquid steel. As such, there is a strong demand for further preventing thermal slag erosion and the permeation of both slag and liquid steel.

SUMMARY OF THE INVENTION

The object of this invention is to resolve the aforementioned problems by providing a coating material featuring lightness in weight, good heat insulating properties, and excellent abilities to prevent thermal slag erosion and permeation of slag and liquid steel, and which does not stick to the base refractories.

In order to resolve the aforementioned problems, the coating material of this invention reduces the bulk density of the aggregate, increases the denseness of the matrix structure and enhances heat insulating properties by replacing the conventional basic aggregate with 5 to 60% by weight of lightweight magnesia aggregate having a bulk density of 2.0 or less. Namely, this invention achieves weight reduction and improvement of heat insulating properties by means completely different from the conventional ones.

To be more specific, the desired weight reduction, improvement of heat insulating properties, prevention of sticking to the base refractories, and prolonging of the life of base refractories are achieved by replacing part of such conventionally used aggregates as magnesia, spinel and dolomite clinkers having a bulk density of 2.5 to 3 or even more, with a lightweight magnesia aggregate having a bulk density of 2.0 or less.

While the need for a foaming agent is eliminated, the use of fibers can be reduced to such a quantity as is required to assure efficient troweling and gunning, and relieve stresses to a low enough level to prevent undesirable protrusion under intense heat.

This permits reducing the crevices in the matrix to a minimum to maintain its close density. Then, while preventing the permeation of slag and liquid steel, the service life of the refractories is prolonged by reducing the sticking of the coating material to the base refractories and cutting down the thermal load imposed on the base refractories by means of weight reduction and improvement of heat insulating properties.

DESCRIPTION OF THE PREFERRED EMBODIMENTS

For the purpose of this invention, lightweight magnesia aggregates prepared by various methods can be used, but their bulk density should be 2.0 or less, because aggregates having greater bulk density will not bring about satisfactory weight reduction.

Figure 1:
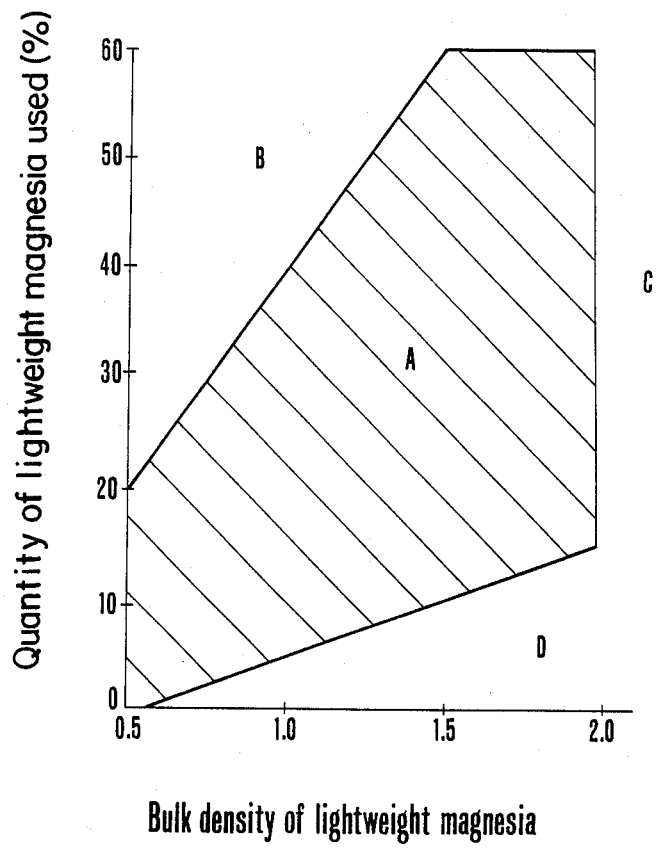
FIG. 1 is a graphical representation of the region in which lightweight magnesia aggregate can be used with satisfactory results.

The blend ratio varies with the bulk density of lightweight magnesia to be used. The preferable range is from 5 to 40% by weight for a bulk density of 1.0, and from 10 to 60% by weight for a bulk density of 1.5, as shown in FIG. 1. Adequate weight reduction is unattainable with lower ratios, and substantial rebound losses during gunning and strength degradation can result from high ratios. In FIG. 1, A denotes a region in which satisfactory results are obtained, B a region where strength degradation occurs, C a region where weight reduction and workability are insufficient, and D a region where bulk density is too low.

In this invention, one or more phosphates, such as sodium phosphate, calcium phosphate, magnesium phosphate, potassium phosphate and aluminum phosphate, and one or more silicates, such as sodium silicate, potassium silicate and lithium silicate are used as the binder. One or more of calcium hydroxide, calcium carbonate, gypsum, Portland cement, alumina cement, magnesium slag, dicalcium silicate and various kinds of calcium phosphates are used as the hardening agent. Further, one or more of organic fibers such as cotton, synthetic fibers, pulp and paper, and inorganic fibers such as ceramic fibers, glass fibers and asbestos are used as the fiber.

Figure 2:
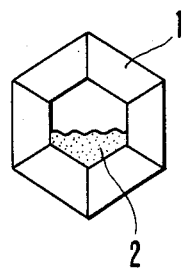
FIG. 2 is a schematic cross-sectional view of a horizontal rotary erosion tester used in the assessment of erosion resistance.

Now the results of experiments conducted on the coating materials according to this invention will be described in the following. Table 2 lists the mixtures A to K prepared by adding the same kind and amount of binder and hardening agent to aggregates comprising different kinds of size-adjusted lightweight magnesia (a), (b), (c) and (d) shown in Table 1 and size-adjusted seawater clinker, to which a minimum necessary amount of organic fibers to assure good workability was added. (The mixture K is a fiber-based lightweight material prepared for the purpose of comparison.) The mixtures were gunned and formed, and then dried at a temperature of 110° C. for 24 hours. In test (1), a sample of each mixture was put in a horizontal rotary erosion testing furnace of the type shown in FIG. 2. After being held at 1550° C. for 3 hours with a slag having a C/S ratio of 1 (C/S=1), the permeation depth of slag was determined. In FIG. 2, reference numeral 1 designates a sample of the coating material and 2 the slag.

Figure 3:
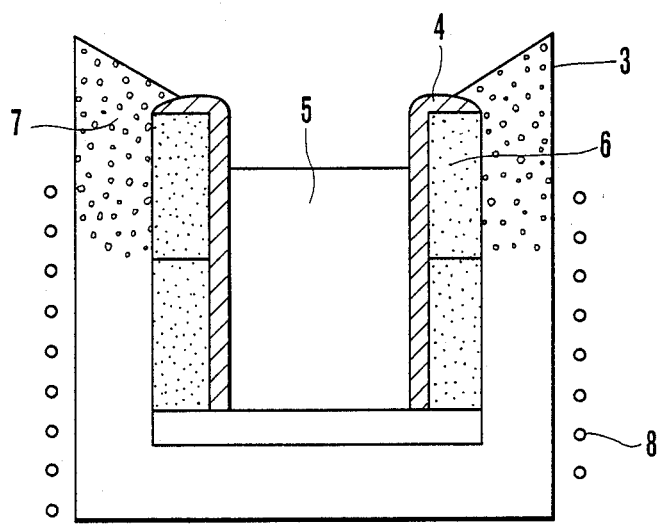
FIG. 3 is a schematic cross-sectional view of the lining set of a large-sized high-frequency furnace used in the assessment of the resistance to slag erosion and the permeation of slag and liquid steel.

In test (2), the materials A to G were gunned and dried in the same manner as in test (1), and then put in a large-sized high-frequency furnace of the type shown in FIG. 3. Using a slag having a C/S ratio of 1 (C/S=1), 210 kg of iron was melted at 1550° C. and kept in the molten state for 5 hours. Then, the erosion rate of the slag line and the permeation of liquid steel were checked. In FIG. 3, reference numeral 3 designates a large-sized high-frequency furnace, 4 a 20 mm thick inner lining consisting of the gunned coating material, 5 pig iron, 6 the base refractories, 7 a ramming material consisting of magnesium oxide, and 8 a heating coil.

No adequate weight reduction was achieved with (B) in which the ratio of lightweight magnesia aggregate (a) was 3.2 percent. But the effect of weight reduction appeared in the rest of the samples containing higher percentages of lightweight magnesia aggregate. Considerable strength degradation was observed in (E) and (I) in which lightweight magnesia was increased to over 60 percent by weight, while seawater magnesia needed to maintain good workability was left unreduced. Also, weight reduction was not substantial enough in (J) in which aggregate (d) with a bulk density of 2.45 was used.

Compared with the fiber-based lightweight type (K) prepared for the purpose of comparison, (C), (D), (F), (G) and (H) exhibited smaller slag permeation depths and lower slag erosion rates, evidencing the effect of durability improvement through matrix strengthening. Also, they proved to have better ability to prevent the permeation of liquid steel.

As described above, the lightweight heat-insulating tundish coating material of this invention not only has good heat insulating properties but also has higher ability to prevent the permeation of slag and liquid steel, has greater resistance to thermal slag erosion, prevents sticking to the base refractories and thus makes an outstanding contribution to prolonging the service life of base refractories.

TABLE 1

| | Properties of Lightweight Magnesia Aggregates | | | | |
| --- | --- | --- | --- | --- | --- |
| | | | | | Example for Comparison |
| | (a) | (b) | (c) | (d) | Common Seawater Magnesia |
| Bulk density | 1.00 | 1.40 | 1.60 | 2.45 | 3.39 |
| Apparent Specific Gravity | 3.57 | 3.26 | 3.20 | 3.46 | 3.31 |
| Apparent Porosity | 71.8 | 57.0 | 50.0 | 29.2 | 2.3 |

TABLE 2

| Designation | Example for comparison A | Example for comparison B | Embodiment C | Embodiment D | Example for comparison E | Embodiment F | Embodiment G | Embodiment H | Example for comparison I | Example for comparison J | Example for comparison K |
| --- | --- | --- | --- | --- | --- | --- | --- | --- | --- | --- | --- |
| Lightweight magnesia (a) 2-1 mm (part by weight) | | 3 | 5 | 10 | 10 | | | | | | |
| Lightweight magnesia (a) 1 mm and under (part by weight) | | | | 10 | 15 | | | | | | |
| Lightweight magnesia (c) 2-1 mm (part by weight) | | | | | | 5 | 10 | 16 | 16 | | |
| Lightweight magnesia (c) 1 mm and under (part by weight) | | | | | | | | 16 | 20 | | |
| Lightweight magnesia (d) 2-1 mm (part by weight) | | | | | | | | | | 25 | |
| Lightweight magnesia (d) 1 mm and under (part by weight) | | | | | | | | | | 37 | |

TABLE 2-continued

| Designation | Example for comparison A | Example for comparison B | Embodiment C | Embodiment D | Example for comparison E | Embodiment F | Embodiment G | Embodiment H | Example for comparison I | Example for comparison J | Example for comparison K |
|---|---|---|---|---|---|---|---|---|---|---|---|
| 1 mm and under (part by weight) Common seawater magnesia 2-1 mm (part by weight) | 35 | 25 | 17 | — | — | 25 | 15 | — | — | — | 35 |
| Common seawater magnesia 1 mm and under (part by weight) | 50 | 50 | 50 | 17 | — | 50 | 50 | 18 | — | — | 50 |
| Common seawater magnesia 0.044 mm and under (Part by weight) | 15 | 15 | 15 | 15 | 15 | 15 | 15 | 15 | 15 | 15 | 15 |
| Organic fibers (part by weight) | 1 | 1 | 1 | 1 | 1 | 1 | 1 | 1 | 1 | 1 | 3 |
| Sodium phosphate (part by weight) | 2 | 2 | 2 | 2 | 2 | 2 | 2 | 2 | 2 | 2 | 2 |
| Calcium hydroxide (hardening agent) (part by weight) | 1 | 1 | 1 | 1 | 1 | 1 | 1 | 1 | 1 | 1 | 1 |
| Properties (after holding at 110° C. for 24 hours) | | | | | | | | | | | |
| Bulk density | 2.15 | 2.07 | 1.98 | 1.55 | 1.36 | 2.03 | 1.91 | 1.60 | 1.31 | 2.04 | 1.70 |
| Bending strength (kg/cm$^2$) | 23 | 22 | 20 | 10 | 3 | 21 | 13 | 11 | 2 | 8 | 8 |
| Gunning efficiency Amount of rebound loss | Little | Little | Little | Little | Somewhat large | Little | Little | Little | Somewhat large | Little | Little |
| Test (1) Depth of slag Penetration (mm) | 25 | 24 | 20 | 15 | 15 | 21 | 18 | 16 | 15 | 19 | 32 |
| Test (2) Resistance to slag erosion (%) | 18 | 18 | 16 | 14 | 19 | 17 | 16 | 14 | 20 | 15 | 20 |
| penetration of liquid steel | None | None | None | None | None | None | None | None | None | None | Occurred |
| Lightweight magnesia (percent by weight) | 0 | 3.2 | 5.7 | 38.5 | 62.5 | 5.2 | 11.1 | 49.2 | 70.6 | 80.6 | 0 |
| Common seawater magnesia (percent by weight) | 100 | 96.8 | 94.3 | 61.5 | 37.5 | 94.7 | 88.9 | 50.8 | 29.4 | 19.4 | 100 |

What is claimed is:

1. In an interior coating material for continuous caster tundishes which consists essentially of a mixture of aggregate, a binder, a hardening agent and fibers, the improvement wherein the aggregate is a mixture of 5 to 60% by weight of a lightweight magnesia aggregate having a bulk density of 2.0 or less, and 40 to 95% by weight of a member selected from the group consisting of electrically molten magnesia clinker, seawater magnesia clinker, burnt clinker prepared from natural magnesite, dolomite clinker, spinel clinker and a mixture thereof, based on the total weight of the aggregate.

* * * * *